United States Patent [19]
Leshik et al.

[11] Patent Number: 6,117,473
[45] Date of Patent: Sep. 12, 2000

[54] REFRIGERATOR-STABLE, NON-DAIRY FOAM

[75] Inventors: Richard Robert Leshik, Brookfield, Conn.; Maria del Pilar Cobos, Port Chester, N.Y.

[73] Assignee: Kraft Foods, Inc., Northfield, Ill.

[21] Appl. No.: 09/336,298

[22] Filed: Jun. 21, 1999

[51] Int. Cl.⁷ ................................................. A23L 1/05
[52] U.S. Cl. .................. 426/564; 426/565; 426/573; 426/576
[58] Field of Search ........................ 426/564, 571, 426/576, 565, 577, 573

[56] References Cited

U.S. PATENT DOCUMENTS

| | | | |
|---|---|---|---|
| 1,993,289 | 3/1935 | Stokes | 426/576 |
| 2,588,308 | 3/1952 | Tressler | 426/564 |
| 2,692,201 | 10/1954 | Conrad | 426/576 |
| 3,362,830 | 1/1968 | Addesso | 426/564 |
| 3,365,305 | 1/1968 | Hunter | 426/564 |
| 3,579,355 | 5/1971 | Wyss et al. | 99/130 |
| 3,619,208 | 11/1971 | Bahoshy | 426/577 |
| 3,734,745 | 5/1973 | Cassanelli et al. | 99/130 |
| 3,903,310 | 9/1975 | Burde | 426/564 |
| 3,930,050 | 12/1975 | Faber | 426/564 |
| 4,107,343 | 8/1978 | Petricca | 426/564 |
| 4,210,679 | 7/1980 | Meili | 426/564 |
| 4,238,519 | 12/1980 | Chang | 426/564 |
| 4,251,561 | 2/1981 | Gajewski | 426/576 |
| 4,297,379 | 10/1981 | Topalian et al. | 426/565 |
| 4,312,891 | 1/1982 | Eisfeldt | 426/576 |
| 4,451,492 | 5/1984 | Dell | 426/564 |
| 4,476,145 | 10/1984 | Hardie-Muncy | 426/564 |
| 4,500,552 | 2/1985 | Kadeson | 426/576 |
| 4,542,035 | 9/1985 | Huang | 426/565 |
| 4,572,837 | 2/1986 | Poole | 426/564 |
| 4,576,624 | 3/1986 | Ravel | 426/564 |
| 4,587,130 | 5/1986 | Stauber | 426/565 |
| 4,668,520 | 5/1987 | Okonogi | 426/564 |
| 4,869,917 | 9/1989 | Cunningham | 426/564 |
| 5,004,623 | 4/1991 | Giddey | 426/576 |
| 5,124,169 | 6/1992 | Kohara | 426/564 |
| 5,328,711 | 7/1994 | Coleman | 426/576 |
| 5,348,756 | 9/1994 | Lee | 426/576 |
| 5,505,982 | 4/1996 | Krawczyk | 426/99 |
| 5,820,913 | 10/1998 | Grassler et al. | 426/564 |

*Primary Examiner*—Carolyn Paden
*Attorney, Agent, or Firm*—Thomas R. Savoie; Thomas A. Marcoux

[57] ABSTRACT

A non-dairy, refrigerator-stable foam having an overrun of 50–350% is formulated from water, sweetener, hydrogenated vegetable oil, non-ionic emulsifier having an HLB of at least 10 and a gelling hydrocolloid having a gel temperature below 80° F. (21.1° C.). Preferably, the emulsifier is polysorbate 60 and/or sucrose fatty acid ester and the gelling hydrocolloid is gelatin. The foam may be free of non-gelatin protein material and has a pH of 3.2–4.6. The foam may be packaged as a ready-to-eat dessert or used as a topping on packaged, ready-to-eat dessert gels or puddings.

15 Claims, No Drawings

REFRIGERATOR-STABLE, NON-DAIRY FOAM

BACKGROUND OF THE INVENTION

Field of the Invention

This invention relates to a refrigerator-stable foam that is useful for the production of refrigerator-stable ready-to-eat desserts.

Consumers have in recent times been desirous of foods that are ready-to-eat. This is particularly true in the categories of snacks and desserts. Thus, packaged desserts, especially in single-service packaging, of gels and puddings have become quite popular. These products must be formulated and processed in a manner as to be stable for a period of at least three months in order to accommodate commercial distribution, sale and use cycles. To date, the products have primarily been puddings or gels and have not included foams, particularly not non-dairy foams.

Non-dairy foams are particularly desirable and versatile as such formulations would be tolerant to low pH conditions. Acid-tolerant foams are useful for making acidic foamed desserts such as a fruit-flavored mousse and/or useful as a topping on an acidic gel, such as a fruit-flavored gelatin.

SUMMARY OF THE INVENTION

This invention relates to an edible, non-dairy foam that has a fine air cell structure and which is refrigerator-stable for at least three months such that the foam may be used in packaged, ready-to-eat desserts. The foam may constitute the entire or substantially the entire dessert and be sold as a mousse-like dessert or the foam may be used as a topping for a pudding or dessert gel product. In either embodiment, the foam will withstand the rigors of refrigerated distribution, sale and use to which packaged ready-to-eat food products are subjected and will retain a fine air cell structure and not suffer collapse.

The foams of this invention, which are formulated substantially free of dairy proteins or dairy-derived protein material, such as sodium caseinate, are tolerant to acid conditions and may be formulated as a low-acid food having a pH of 3.2–4.6. This would permit formulation of an acidic, fruit-flavored, mousse-like foam or a foam which is suitable for use as a topping on a fruit-flavored gel such as a gelatin dessert. Typically, gelatin will be the only functional or significant protein material contained in the formulation of this invention.

The absence of heat-coagulable protein from the foam formulations of this invention also permits the formulation to be aseptically processed. For foods above pH 4.6, this would normally entail heat treatment in the ultra-high temperature (UHT) range.

According to this invention, the foam formulation is comprised of water, sweetener, 2–30% hydrogenated vegetable oil, 0.05–1% non-ionic emulsifier having an HLB of at least 10, and 0.3–2% gelling hydrocolloid having a gel temperature below 80° F. (26.7° C.). Other functional ingredients such as flavors, colors, acidifying agents and buffer agents could be included in the formulation for their known functionalities.

All percentages, except percent overrun recited in the description and claims for this invention are stated as percents by weight.

DESCRIPTION OF THE PREFERRED EMBODIMENTS

The sweetener may be comprised of one or more sugars, such as sucrose, fructose, dextrose, and/or sugar syrups, such as high fructose corn syrup, and/or intensive sweeteners, such as aspartame, acetosulfame, alitame, saccharin, cyclamates, and trichloro sucrose. In the event one or more intensive sweeteners are used, bulking agents may be included in the formulation to provide additional solids and provide body to the foam structure. Typical bulking agents would be maltodextrin, polydextrose, polyglucose, xylitol, mannitol and sorbitol. For formulation calculations, all of these materials are considered to be included in the sweetener component. For taste purposes and for ease of operation, the sweetener component will normally consist of sucrose or sucrose-fructose combinations.

The hydrogenated vegetable oil should be one having a melting point of 80–120° F. (26.7–48.9° C.), preferably 95–115° F. (35–46.1 ° C.). The preferred oils are tropical oils, such as coconut and palm kernel oil, with a combination of coconut and palm kernel oils being most preferred.

The non-ionic emulsifier may be one or more emulsifiers each having an HLB (hydrophile-lipophile balance) of at least 10 and preferably from 14–16. Ionic emulsifiers, such as sodium stearoyl lactylate, and/or emulsifiers having an HLB below 10, such as glycerol monostearate and distilled monoglycerides, should not be included in the formulation as their presence will detract from foam stability. Specifically, ionic emulsifiers and low HLB emulsifiers will not produce a foam having fine, tight air cells. Food-approved emulsifiers which are presently known to fit the parameters of this invention include polysorbate 60 and sugar esters which are mono, di- and/or triesters of palmitic and/or stearic acid. These emulsifiers will enable production of a stable foam having a fine, tight air cell structure.

The HLB of an emulsifier of the surface-active-agent type is an expression of the size and strength of the hydrophilic and lipophilic groups that compose the emulsifier molecule. A strongly lipophilic emulsifier has a low HLB number, usually less than 9; a highly hydrophilic emulsifier has a high HLB number, over 10. The numbers for typical food emulsifiers range from 2.8 to 16. These numbers have been determined experimentally or by calculation and as known to those skilled in the art. If two surfactants are used as a blend, the HLB of the combination may be found by multiplying the weight proportion of each surfactant by its HLB value to find its contribution to the total HLB and then adding the two values.

The preferred gelling hydrocolloid with a gel temperature below 80° F. (26.7° C.) is gelatin. Gelling hydrocolloids that possess a gelling temperature above 80° F. should not be included in the formulation, since in typical commercial operations, the formulation is whipped to a foam at temperatures below 80° F. It would be possible to include non-gelling hydrocolloids, such as guar and xanthan gums, in the formulation if additional water binding capacity is needed. The presence of these non-gelling hydrocolloids would likely necessitate a higher level of gelatin. Both acid-treated and base-treated gelatins are suitable for use in this invention. References to gelatin weights in the description and claims of this invention are based on 300 bloom gelatin. As is well-known to those skilled in the art, gelatin levels are routinely adjusted to account for differing bloom values.

Ingredient weight ranges for use in this invention are as follows:

| INGREDIENT | WEIGHT RANGE | PREFERRED WEIGHT RANGE |
|---|---|---|
| Water | 40–95 | 58–70 |
| Sweetener | .05–40 | 10–30 |
| Hydrogenated Vegetable Oil | 2–30 | 10–20 |
| Gelling Hydrocolloid | 0.3–2 | 0.5–1.8 |
| Non-Ionic Emulsifier | 0.05–1 | 0.1–0.5 |

The process steps employed to produce the foams of this invention are conventional in nature. The ingredients are batched, homogenized, pasteurized or sterilized depending upon the food safety requirements for the product, cooled, whipped and then fed to filling equipment. Whipping will be employed to produce an overrun of from 50–350%, preferably 100–200%.

The invention is further described, but not limited by the following examples.

| | WEIGHT PERCENT Formula | | | |
|---|---|---|---|---|
| INGREDIENT | A | B | C | D |
| Water | 63.44 | 63.44 | 73.13 | 73.16 |
| Sucrose | 20 | 20 | 20 | 20 |
| Hydrogenated Coconut/Palm Kernel Oil (m.p. 102° F.) | 15 | 15 | 5 | 5 |
| Gelatin (300 bloom) | 0.7 | 0.7 | 1.20 | 0.7 |
| Sucrose Fatty Acid Ester (70% monoester/70% stearate) | 0.2 | 0.3 | | 0.3 |
| Polysorbate 60 | 0.10 | — | 0.14 | — |
| Citric Acid | 0.01 | 0.01 | 0.03 | — |
| Flavor/Color | 0.55 | 0.55 | 0.50 | 0.50 |
| pH | 4.4 | 4.4 | 4.4 | 5.5 |
| % Overrun | 150–200 | 150–200 | 150–200 | 150–200 |

Water was heated to 120° F. (48.9° C.) which is above the melting point of the fat. All of the remaining ingredients except the gelatin were blended into the heated water. The blend was homogenized at 5,000 psi ($3.44 \times 10^7$ newtons/meter$^2$) then cooled to 40° F. (4.4° C.). Gelatin solids were then metered into the homogenized emulsion which is kept agitated in a tank in order to keep the gelatin in suspension. For Formulas A, B and C batch is then pumped through a plate heat exchanger to effect pasteurization. For Formula D, the batch is pumped through scraped-surface heat exchangers to achieve UHT conditions. The heat treated product is then cooled to below 80° F. (26.7° C.) and it is then whipped in a whipping Contherm™ provided with injected steril air to an overrun of 150%. The foam was added as a top layer onto the surface of a liquid gelatin gel having a surface temperature of less than 80° F. (26.7° C.). The liquid gelatin gel was contained in single serving-sized plastic cups. The cups were then sealed with foil lidding stock, cooled and then refrigerated at 40° F. (4.4° C.). At zero time, the foam topping had a fine cell structure and did not melt at the gelatin surface. After six months of refrigerated storage, the foam topping retained its fine cell structure and did not sustain noticeable collapse in height.

When used as a topping, the foam would usually be flavored and colored to resemble a whipped cream topping. When used as a foamed dessert, the foam would typically be fruit-flavored and colored, such as strawberry mousse.

Formulas A, B, and C produce toppings well-suited for use with fruit-flavored gels. Formula D produces a topping well-suited for use with puddings.

Having thus described the invention what is claimed is:

1. An non-dairy foam having an overrun of from 50–350%, said foam being refrigerator-stable for a period of at least 3 months, containing water, sweetener, 2–30% hydrogenated vegetable oil, 0.05–1% non-ionic emulsifier having an HLB of at least 10, and 0.3–2% gelling hydrocolloid having a gel temperature below 80° F.

2. The foam of claim 1 wherein the pH of the foam is from 3.2–4.6.

3. A layered, ready-to-eat dessert comprised of a bottom layer of gelatin gel or pudding and a top layer of the foam of claim 1.

4. The foam of claim 1 wherein the stabilizer is comprised of gelatin.

5. The foam of claim 1 the stabilizer consists of 0.5–1.8% gelatin.

6. The foam of claim 1 wherein emulsifiers present in the foam consist of one or more non-ionic emulsifiers each having an HLB of at least 10.

7. The foam of claim 1 wherein the non-ionic emulsifier is selected from the group consisting of polysorbate 60, sucrose fatty acid ester and combinations thereof.

8. The foam of claim 7 wherein the emulsifier level is 0.1–0.5%.

9. The foam of claim 1 wherein the HLB of the emulsifier is from 14 to 16.

10. The foam of claim 1 wherein the overrun is from 100 to 200%.

11. The foam of claim 1 wherein the hydrogenated vegetable oil has a melting point of 80–120° F.

12. The foam of claim 11 wherein the hydrogenated vegetable oil is coconut oil, palm kernel oil or combinations thereof.

13. The foam of claim 1 wherein the foam is substantially free of dairy proteins or dairy derived protein material.

14. The foam of claim 1 wherein the foam is substantially free of non-gelatin protein.

15. The foam of claim 1 wherein the water content is 58–70% and the sweetener content is 10–30%.

* * * * *